(12) United States Patent
Porthault et al.

(10) Patent No.: US 9,882,232 B2
(45) Date of Patent: Jan. 30, 2018

(54) CABLE-TYPE BATTERY AND METHOD FOR FABRICATING A CABLE-TYPE BATTERY

(71) Applicant: COMMISSARIAT À L'ENERGIE ATOMIQUE ET AUX ENERGIES ALTERNATIVES, Paris (FR)

(72) Inventors: Hélène Porthault, Echirolles (FR); Sami Oukassi, Saint-Egrève (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 286 days.

(21) Appl. No.: 14/797,578

(22) Filed: Jul. 13, 2015

(65) Prior Publication Data
US 2016/0020483 A1  Jan. 21, 2016

(30) Foreign Application Priority Data
Jul. 16, 2014 (FR) ...................... 14 01588

(51) Int. Cl.
*H01M 4/00* (2006.01)
*H01M 10/04* (2006.01)
(Continued)

(52) U.S. Cl.
CPC ....... *H01M 10/0431* (2013.01); *H01M 2/145* (2013.01); *H01M 2/1646* (2013.01);
(Continued)

(58) Field of Classification Search
CPC .. H01M 4/0402; H01M 2/145; H01M 10/054; H01M 10/052; H01M 10/0431;
(Continued)

(56) References Cited

U.S. PATENT DOCUMENTS

2012/0009331 A1   1/2012  Kwon et al.
2012/0015239 A1*  1/2012  Kwon ................. H01M 2/0237
                                            429/164
(Continued)

FOREIGN PATENT DOCUMENTS

KR      2007-0075928 A    7/2007
KR   10-2014-0076516 A    6/2014
WO       03/023880 A2    3/2003

OTHER PUBLICATIONS

Kwon et al., "Cable-Type Flexible Lithium Ion Battery Based on Hollow Multi-Helix Electrodes," Advanced Materials, 2012, vol. 24, pp. 5192-5197.

*Primary Examiner* — Gary Harris
(74) *Attorney, Agent, or Firm* — Oliff PLC

(57) ABSTRACT

A cable-type battery comprising:
  at least a first strand of a first polarity type,
  at least a second strand of a second polarity type, the second polarity type being the opposite of the first polarity type,
  an electrolyte layer in which the first strand and the second strand are arranged, the electrolyte layer being ionically conducting and electrically insulating, the first strand being ionically connected to the second strand.
The first strand is coated by a spacer layer, the spacer being electrically insulating, the spacer being configured to prevent any direct contact between the first strand and the second strand.
The strength of the material forming the spacer is greater than the strength of the material forming the electrolyte layer.

28 Claims, 4 Drawing Sheets

(51) Int. Cl.
*H01M 2/16* (2006.01)
*H01M 2/18* (2006.01)
*H01M 4/66* (2006.01)
*H01M 4/75* (2006.01)
*H01M 10/05* (2010.01)
*H01M 10/0562* (2010.01)
*H01M 10/0565* (2010.01)
*H01M 10/058* (2010.01)
*H01M 2/14* (2006.01)
*H01M 4/04* (2006.01)
*H01M 10/052* (2010.01)
*H01M 10/054* (2010.01)

(52) U.S. Cl.
CPC ............ *H01M 2/1653* (2013.01); *H01M 2/18* (2013.01); *H01M 4/0402* (2013.01); *H01M 4/661* (2013.01); *H01M 4/662* (2013.01); *H01M 4/75* (2013.01); *H01M 10/05* (2013.01); *H01M 10/052* (2013.01); *H01M 10/054* (2013.01); *H01M 10/058* (2013.01); *H01M 10/0562* (2013.01); *H01M 10/0565* (2013.01); *H01M 2220/30* (2013.01); *H01M 2300/0068* (2013.01); *H01M 2300/0082* (2013.01)

(58) Field of Classification Search
CPC ...... H01M 4/662; H01M 2/1653; H01M 2/18; H01M 4/661; H01M 4/75; H01M 10/05; H01M 10/0562; H01M 10/0565; H01M 10/058; H01M 2300/0068; H01M 2300/0082
USPC ................................ 429/94; 29/623.1, 623.5
See application file for complete search history.

(56) References Cited

U.S. PATENT DOCUMENTS

2014/0011065 A1 1/2014 Kwon et al.
2014/0170456 A1 6/2014 Kwon et al.

* cited by examiner

CABLE-TYPE BATTERY AND METHOD FOR FABRICATING A CABLE-TYPE BATTERY

BACKGROUND OF THE INVENTION

The invention relates to a cable-type battery and to the method for fabricating same.

STATE OF THE ART

Over the past few years, energy requirements have multiplied and a great deal of research is being carried out not only to improve the performances of batteries but also to optimize their architecture, and in particular to miniaturize them. Miniaturization of batteries is a major issue, in particular for applications in electronics for the general public such as the portable device market—mobile phones, tablet computer and such like.

Recently, a new family of batteries has made its appearance—batteries in the form of cables, also called cable-type batteries. This new type of battery should enable the increasing requirements of miniaturization and flexibility to be met.

Different architectures have been proposed. The first is a coaxial architecture as presented in the documents WO 03/023880 and US 2014/0011065. The architecture is organized around a central current collector on which successive different layers are deposited to form the battery—a first electrode made from a first material, an electrolyte, a second electrode made from a second material, and a second current collector.

Another type of architecture is described in the document US 2014/0011065 (FIG. 1)—the cable-type battery comprises several inner current collectors 410 in wire form, each inner collector being covered by an electrode material 420. The electrodes obtained in this way are arranged parallel to one another and then coated by a layer called separation layer 430. This layer prevents short-circuiting between the electrodes. Another layer of electrode material 440 is deposited on the outer surface of the separation layer 430. Finally, an outer current collector 450 is deposited on the whole assembly. Alternatively, the inner electrodes can be coiled in the form of spirals ("Cable-type Flexible Lithium ion Battery Based on Hollow multi-Helix Electrodes", Adv. Mater. 2012, 24, 5192-5197). The coil presents an empty space void in its center, which improves the flexibility of the assembly. The space can be filled by the electrolyte.

However, these architectures, with outer electrodes, do not provide a great freedom of balancing between the two electrode materials.

Another type of architecture, without an outer electrode, is described in the document US 2012/0009331, and is represented in FIG. 2. The material forming anode 111 and cathode 121 are deposited on different metal wires 120 and 110 in order to form electrodes. The electrodes are then coated in the electrolyte sheath.

In order to ensure electric insulation between the wires, the electrodes of the same polarity are further individually covered by an electrolyte layer 131. This layer ensures both the electric insulation and the ionic conductivity between the electrode materials. All the wires are then coated by the same electrolyte sheath 132 to form the final cable-type battery.

Although such a structure enables balancing between the electrode materials to be improved, the structure does not make it possible to ensure the absence of short-circuits when assembly of the wires is performed. The latter can therefore not be tightened in substantial manner. This structure is therefore not yet sufficiently compact to obtain both a good miniaturization and at the same time a high capacity.

OBJECT OF THE INVENTION

The object of the invention is to remedy the shortcomings of the prior art, and in particular to propose a cable-type battery presenting a better resistance to mechanical stresses, mainly compressive and flexural stresses, while at the same time preventing the occurrence of short-circuits.

This object is achieved by a cable-type battery comprising:
- at least a first strand of a first polarity type,
- at least a second strand of a second polarity type, the second polarity type being the opposite of the first polarity type,
- an electrolyte layer in which the first strand and the second strand are arranged, the electrolyte layer being ionically conducting and electrically insulating so that the first strand is ionically connected to the second strand.

The first strand is coated by at least one spacer, the spacer being electrically insulating, the spacer being configured to prevent any direct contact between the first strand and the second strand of opposite polarity.

The mechanical strength of the material forming the spacer is greater than the mechanical strength of the material forming the electrolyte layer.

This object is also achieved by a fabrication method of a cable-type battery comprising the following successive steps:
- providing at least a first strand of a first polarity type, and at least a second strand of a second polarity type, the second polarity type being the opposite of the first polarity type,
- arranging the first strand and the second strand in an ionically conducting and electrically insulating electrolyte layer, the first strand being ionically connected to the second strand.

The first strand is coated by at least one spacer, the spacer being electrically insulating, the spacer being configured to prevent any direct electric contact between the first strand and the second strand.

The mechanical strength of the material forming the spacer is greater than the mechanical strength of the material forming the electrolyte layer.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

The battery in the form of a cable, or cable-type battery 1, comprises:
- at least a first strand 2 of a first polarity type, at least a second strand 3 of a second polarity type, the second polarity type being opposite to the first polarity type, an electrolyte sheath or layer 4 in which first strand 2 and second strand 3 are arranged, said electrolyte layer being ionically conducting and electrically insulating so that first strand 2 is ionically connected to second strand 3.

Figure 1:
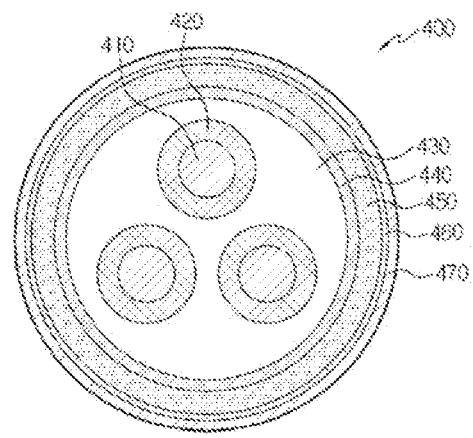
FIGS. 1 and 2 represent cable-type batteries according to the prior art, in schematic manner, in cross-section.
Figure 2:
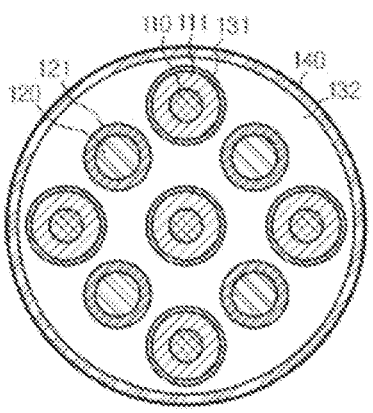
Figure 3:
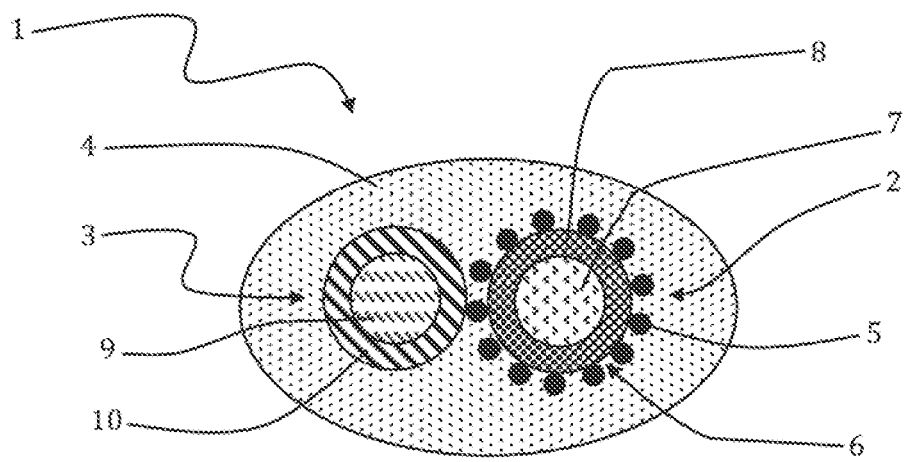
FIGS. 3 to 9 represent cable-type batteries according to different embodiments of the invention, in schematic manner, in cross-section.

As illustrated in FIG. 3, first strand 2 of cable-type battery 1, according to the invention, is further coated by at least one spacer 5.

Spacer 5 is configured to prevent a direct contact between first strand 2 and second strand 3.

Spacer 5 enables a minimum gap to be maintained between first strand 2 and second strand 3.

Preferentially, spacer 5 has a thickness comprised between 10 nm and 10 µm.

Spacer 5 is electrically insulating to prevent any electric contact between first strand 2 and second strand 3, of opposite polarities, so as to prevent short-circuiting between the two strands.

Preferentially, spacer 5 is ionically conducting, which enables the ion exchanges between first strand 2 and second strand 3 to be increased thereby improving the performances of the battery.

The material forming spacer 5 is different from that forming electrolyte layer 4.

Preferentially, spacer 5 is made from ceramic.

The material forming the spacer 5 is preferentially chosen from $Li_xAl_yGe_z(PO_4)_3$ (LAGP), $Li_xAl_yTi_z(PO_4)_3$ (LATP), $Li_xLa_yTiO_7$ (LLTO), $Li_3PO_4$, lithium and phosphorus oxynitride (UPON), and $Al_2O_3$ in nanometric form for example.

According to another embodiment, spacer 5 is made from polymer.

The polymer material forming spacer 5 is chosen from polystyrene (PS), polyethylene terephtalate (PET), polyvinyl chloride (PVC), polytetrafluoroethylene (PTFE), polycarbonate (PC), or polymethyl methacrylate (PMMA).

Preferentially, the mechanical resistance of the material forming spacer 5 is greater than the mechanical resistance of the material forming electrolyte layer 4.

What is meant by strength is the resistance of the material to a deformation induced by a mechanical stress.

The mechanical resistance of a material can be characterized by the Young's modulus of said material.

To withstand mechanical stresses, spacers having a Young's modulus higher or even much higher than the Young's modulus of the electrolyte are advantageously chosen.

What is meant by higher is that the Young's modulus of the spacer is at least 100 times higher than the Young's modulus of the electrolyte layer.

What is meant by much higher is that the Young's modulus of the spacer is at least 1,000 times higher than the Young's modulus of the electrolyte layer.

The cable-type battery could thus be fabricated with a UPON spacer presenting a Young's modulus of 80 GPa, and the electrolyte could be made by means of an inorganic matrix of silicate-base ionogel type presenting a Young's modulus of less than 0.001 GPa.

In another example, the spacer could be made from alumina $Al_2O_3$ presenting a Young's modulus comprised between 380 and 490 GPa, and the electrolyte could be made by means of a polymer matrix of polyethylene type having a Young's modulus comprised between 0.2 and 0.7 GPa.

Advantageously the hardness of the material forming spacer 5 is greater than the hardness of the material forming electrolyte layer 4.

What is meant by greater hardness is that spacer 5 is harder—it opposes penetration of the other strand to prevent a short-circuit. Advantageously, it has a better resistance to torsional, shearing stresses. Spacer 5 presents a good mechanical strength when it is stressed in torsion and/or in compression for example.

Advantageously, the material forming the spacer 5 presents an extended yield point (yield strength) so that the spacer remain in an elastic range when stressed.

Spacer 5 presents a very low mechanical deformation when stressed—a high pressure can be exerted when assembly of the strands is performed.

Unlike a conventional structure comprising strands covered only by an electrolyte layer to provide the electric insulation, this type of architecture provides a better resistance to mechanical stresses, in particular compressive and/or flexural stresses. The strands can be clamped tightly to one another without any risk of deforming or damaging the spacer. Compact structures are thus obtained at the same time considerably limiting the risks of short-circuits.

According to a preferred embodiment, the ionically conducting and electrically insulating spacer 5 is a continuous film totally covering the surface of first strand 2. Spacer 5 enables ion exchanges between first strand 2 and electrolyte layer 4.

Preferentially, the thin film covering first strand 2 is provided with at least one pass-through opening 6, in particular when it is not ionically conducting, to enable contact of the electrolytic layer with first strand 2 and ion exchanges between the strands of opposite polarity.

Preferentially, the thin film is provided with a plurality of pass-through openings 6 and/or the film presents discontinuities.

According to a preferred embodiment, first strand 2 is coated by a plurality of spacers 5 so as to form a spacer layer 5.

Spacers 5 are advantageously arranged over the whole of first strand 2, i.e. over the whole length and over the whole circumference of the outer surface of first strand 2, which enables a minimum gap to be maintained between first strand 2 and second strand 3 at all points of first strand 2.

Preferentially, spacer layer 5 is provided with at least one pass-through opening 6 leaving at least a part of the outer surface of first strand 2 accessible. Opening 6 is advantageously filled by the electrolyte. First strand 2 is in contact with electrolyte layer 4 and spacer 5.

The pass-through hole enables a direct contact between first strand 2 and the electrolyte, which improves the performances of the battery.

Preferentially, spacer layer 5 presents several pass-through openings 6 both on the perimeter and on the length of first strand 2.

Openings 6 are advantageously arranged in homogeneous manner on the whole of the surface of first strand 2 to enable ion exchanges over the whole length of the strand.

According to a preferred embodiment represented in FIG. 3, spacer layer 5 is a layer of particles, the particles being spaced apart from one another so as to form openings 6. The particles are mechanically dissociated from one another. The particles form spacers 5.

The spaces between the particles form pass-through openings 6 of the spacer layer.

Preferentially, the diameter of the particles can vary from 10 nm to 10 µm, depending on the final spacing required between strands of opposite polarity.

Figure 4:
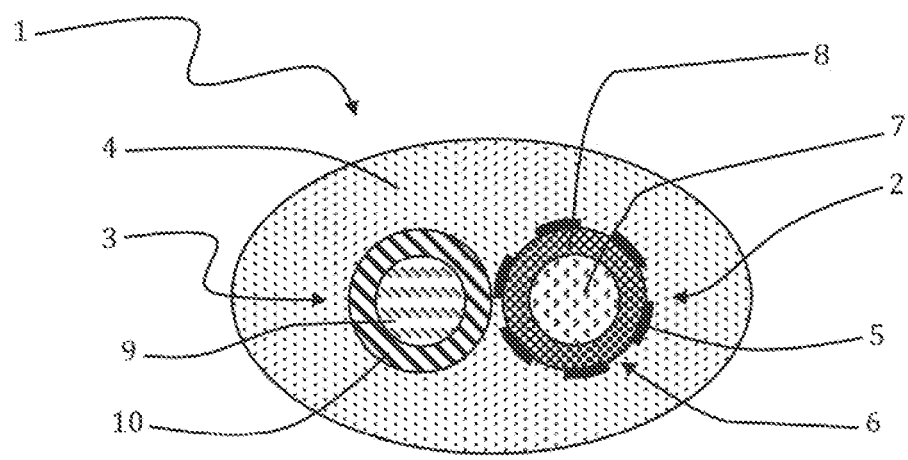

According to another embodiment, and as represented in FIG. 4, spacer layer 5 is formed by a plurality of islands, also called dots, separated from one another by openings 6 so as to leave a part of the outer surface of first strand 2 accessible by the electrolyte.

The thin-film material islands form spacers 5.

The spaces between the islands form pass-through openings 6 of the spacer layer.

The use of a discontinuous spacer layer 5 formed by a plurality of distinct dots or particles enables the flexural characteristics of the strand to be improved so as to limit the risks of delamination of spacer layer 5 with respect to strand 2 which would be liable to result in short-circuiting.

The spaces between the dots or between the particles are filled by electrolyte layer 4 to improve the ion exchanges and therefore the performances of the battery.

Electrolyte layer 4 is arranged so as to separate the first strand from the second strand, i.e. it is arranged between the two strands. First strand 2 is ionically connected to second strand 3 via the ionically conducting electrolyte layer 4. Preferentially, electrolyte layer 4 coats first strand 2 and second strand 3—the first strand and second strand are advantageously sunk in electrolyte layer 4. Electrolyte layer 4 forms a sheath of electrolyte around the two strands. It forms a casing both protecting the strands and at the same time ensuring ionic conduction between the strands.

The strands are positioned within the cable-type battery.

The material of electrolyte layer 4 has to be electrically insulating and ionically conducting.

It advantageously has to present good flexibility properties to give the cable-type battery good mechanical properties.

Advantageously, electrolyte layer 4 is in contact with at least a part of the outer surface of each strand in order to form the ionic junction between said strands.

The electrolyte 4 is advantageously a solid electrolyte.

Advantageously, electrolyte 4 is an electrolyte of polymer type, for example of gel or inorganic type.

Electrolyte 4 is for example formed by a polymer or inorganic matrix, said matrix comprising pores filled by a solution comprising at least one lithium or sodium salt, depending on the type of battery required.

The matrix gives the system the mechanical properties and the solution gives the system the electrochemical properties.

The matrix can for example be a polymer of polyethylene oxide (PEO), bisphenol ethoxylate dimethacrylate A (BEMA), polyvinylidene fluoride (PVDF), polymethyl methacrylate (PMMA), polyacrylonitrile (PAN), or polyvinylidene fluoride hexafluoropropylene (PVDF-HFP) type, or a silica-base inorganic material formed from tetraethyl orthosilicate (TEOS), methyltrimethoxysilane (MTMS), tetramethylorthosilicate (TMOS), triethoxyvinylsilane (TEVOS) or a mixture of these silicon alcoxides.

An inorganic matrix is advantageously obtained by a sol-gel method.

The liquid can be a conventional carbonate-type solvent such as propylene carbonate (PC), dimethyl carbonate (DMC), diethylcarbonate (DEC), or ethylene carbonate (EC), or an ionic liquid from the piperidinium, imidazolium, pyrrolidinium, pyridinium or ammonium anion family, associated with the cations of bis(trifluoromethanesulfonyl)imide $TFSI^-$, bis(fluorosulfonyl)imide $FSI^-$, acetate $CH_3COO^-$, bis(oxalate)borate $B(O_4C_2)_2^-$, bromide $Br^-$, chloride $Cl^-$, iodide $I^-$, tetrachloroaluminate $Cl^-:AlCl_2$, hexafluorophosphate $PF_6^-$, tetrafluoroborate $BF_4$, dicyanamide $N(CN)_2^-$, ethylphosphonate $(C_2H_5O)(H)PO_2^-$, methylphosphonate $(CH_3O)(H)PO_2^-$, hydrogen sulphate $HSO_4^-$, methanesulfonate $CH_3SO_3^-$, or trifluoromethanesulfonate $CF_3SO_3^-$ type.

It can also be formed by a mixture of solvents, by a mixture of ionic liquids or by a mixture of solvents and ionic liquids.

In the case of a lithium battery, the conducting electrolyte contains at least one lithium salt to form $Li^+$ ions.

The lithium salt can be chosen from the group formed by LiCl, LiBr, LiI, $LiClO_4$, $LiBF_4$, $LiPF_6$, $LiAsF_6$, LiFSI, LiTFSI, etc. or be a mixture of these salts.

In the case of a sodium battery, the conducting electrolyte contains at least one sodium salt to form $Na^+$ ions.

According to a preferred embodiment, at least first strand 2 or second strand 3 is formed by a metal wire covered by an electrode material. The metal wire is configured to form a current collector.

The electrode material advantageously covers the outer surface of the metal wire, over the whole length of the metal wire.

According to another preferred embodiment, the two strands 2, 3 are formed by a metal wire covered by an electrode material.

First strand 2 is formed by a first current collector 7 covered by a first electrode material 8.

Second strand 3 is formed by a second current collector 9 covered by a second electrode material 10.

Current collectors 7, 9 are preferably made from Cu, Ni, Ti, Al, Au, Ag, Ta, Ba, Cr, W or a mixture of at least two of these metals. The current collectors can further be made from stainless steel.

They can also be made from a super-alloy. This can for example be a super-alloy containing a large quantity of nickel and/or of chromium of Inconel® brand or of a similar type.

The metal wire forming the current collector has a diameter able to vary from one micrometre to one millimetre.

Current collectors 7, 9 can also be an insulating wire covered by a metal layer, i.e. an insulating core covered by a metallic sheath. Advantageously, the metal layer does not present any mechanical fragility—there is no occurrence of cracking or of delamination during flexion and/or torsion of the cable-type battery. Advantageously, the metallic material is a material that is electrochemically active with respect to ions exchanged between the first strand 2 and the second strand 3.

Preferentially, current collectors 7, 9 are in the form of wires and present a circular cross-section. According to other alternatives, current collectors 7, 9 can present cross-sections of variable geometry, a cubic or hexagonal cross-section can therefore be envisaged.

Likewise, the outer surface of current collector 7, 9 can be modified in order to improve the adhesion of electrode material 8, 10 on current collectors 7, 9. It can thus be made rougher or smoother, or it can be functionalized for example by means of deposition of an adhesion layer.

Electrode material 8, 10 is advantageously a material that is electrochemically active with respect to the ions exchanged between first strand 2 and second strand 3.

Preferentially, the ions exchanged between first strand 2 and second strand 3 are lithium or sodium ions.

The electrode material is advantageously electrochemically active with respect to lithium or sodium ions.

The materials envisaged, in the case of lithium, are the materials conventionally used for lithium batteries such as lithium insertion materials of the LiMO group such as $LiCoO_2$, $LiFeO_2$, $LiNiO_2$, $LiMn_2O_4$, $LiM_xMn_{2-x}O_4$ with $0 \leq x \leq 0.5$ and M=Ni, Co, Fe, Ti, etc., $LiCoPO_4$, $LiFePO_4$, $Li_4TiO_{12}$, or S, metals such as Si, Sn, Li, Zn, Mg, Cd, Ce, Ni, Fe, Bi, Sb, Co, as well as alloys, $Me_xO_y$ oxides, sulphides $Me_xS_y$, or complexes of these metals such as MF, $MF_2$ etc.

Electrode materials 8, 10 are chosen so as to give first electrode material 8 a first polarity type and second electrode material 10 a second polarity type. The reversed polarities, also called opposite polarities, enable an anode material and a cathode material to be formed.

The material of first strand 2 can be an anode material and the material of second strand 3 can be a cathode material.

According to another embodiment, the material of first strand 2 can be a cathode material and the material of second strand 3 can be an anode material.

Electrode material 8, 10 has a thickness comprised between 100 nm and 100 μm. The thickness of the material, coupled to the length of the wire of current collector 7, 9, enables the capacity of the battery to be determined.

Figure 5:
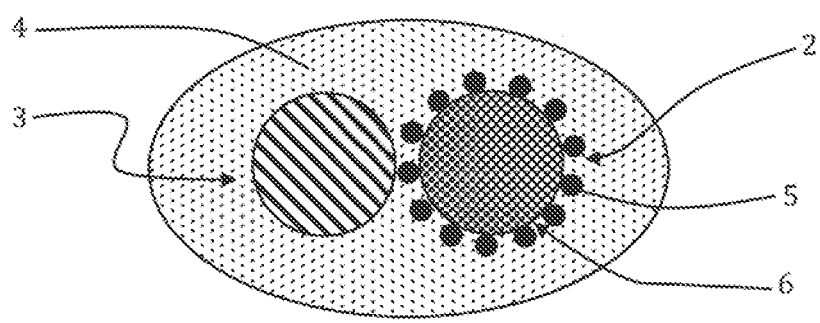

According to a preferred embodiment, and as represented in FIG. 5, strands 2, 3 are formed solely by an electrically conducting material. This material acts both as current collector and as electrode material.

According to a preferred embodiment, at least the first strand or the second strand is made from lithium. A wire or strand made from lithium can be used directly as anode in assembly of a lithium cable-type battery for example. According to another embodiment, in the case of a sodium battery, at least first strand 2 or second strand 3 is made from sodium.

According to another embodiment, first strand 2 or second strand 3 is formed by a current collector covered by an electrode material and the other strand is formed solely by an electrically conducting material acting both as current collector and as electrode material.

Advantageously, cable-type battery 1 comprises a plurality of strands of each polarity. The number of these strands depends in particular on the size of the battery and on its capacity.

The number of strands of first polarity and the number of strands of second polarity is either the same, which enables pairs of anode/cathode strands to be formed, or different according to the desired anode/cathode balancing.

Spacers 5 are advantageously arranged on at least all of the strands of the same polarity type.

According to another embodiment, first strand 2 and second strand 3 are both coated by at least one spacer.

Figure 6:
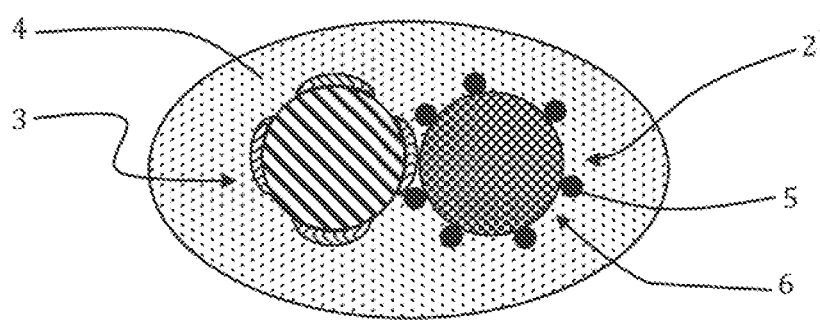

As represented in FIG. 6, the spacers are arranged on at least a part of the strands of opposite polarity. A part of the surface of first strand 2 and of second strand 3 is covered by a layer of spacers so that the strands of opposite polarities are not directly in contact.

The spacers can also be arranged on all the strands whatever their polarity.

According to a particular embodiment, spacers 5, preferably in the form of particles, can also be disseminated in the whole of the electrolyte 4 to give the battery particular properties (mechanical, electrochemical, etc.).

Figure 7:
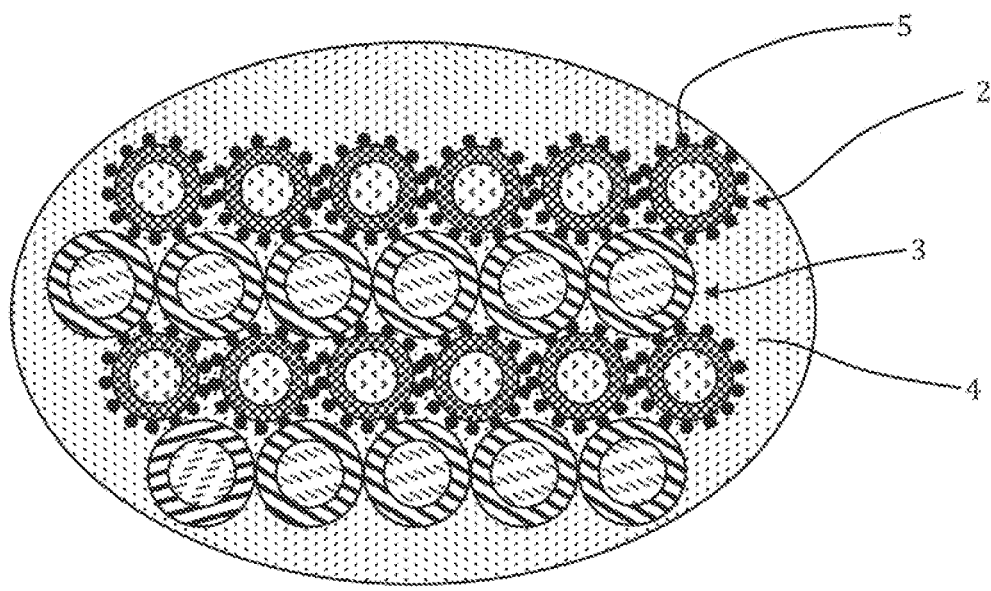
Figure 8:
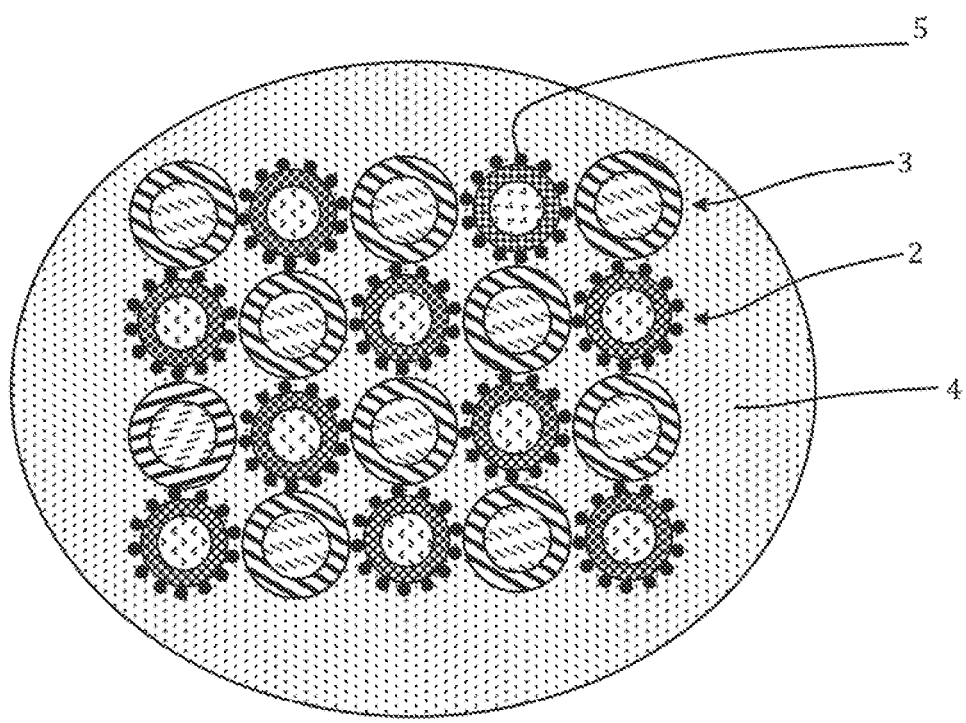

FIGS. 6 to 8 represent different possible architectures for a cable-type battery 1 comprising several strands of opposite polarities—a first group of strands of a first polarity type and a second group of strands of a second polarity type, the second polarity type being the opposite of the first polarity type.

As represented in FIG. 7, the strands of the same polarity can be arranged side by side in order to form a first plane of strands of the first polarity type. The strands of opposite polarity are also arranged side by side in order to form a second plane of strands of the second polarity type.

The first plane and the second plane are then stacked. Other planes can be added alternating planes of opposite polarity.

According to another embodiment, as represented in FIG. 8, each strand of one polarity type is surrounded by four strands of opposite polarity in order to form a grid of strands.

Figure 9:
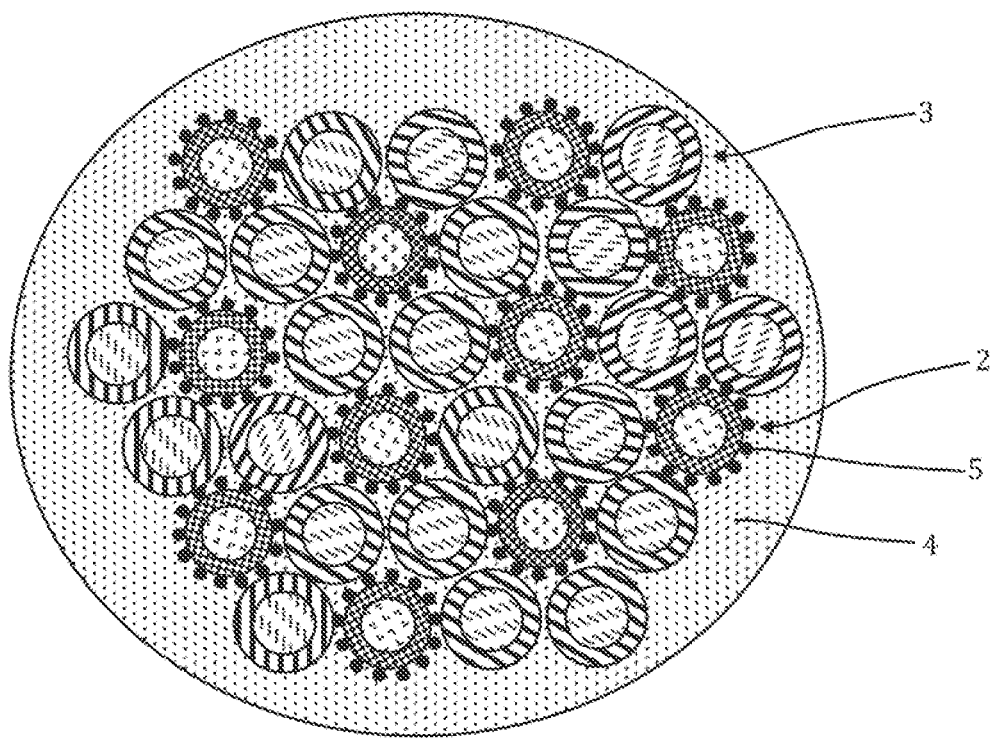

According to another embodiment, as represented in FIG. 9, the strands of the first polarity type are surrounded by six strands of the second polarity type. Seen in cross-section, the six strands of the second polarity type form a hexagon around the strand of the first polarity type.

This architecture enables the arrangement and the number of strands of the cable-type battery to be modified and optimized in order to improve the performances of the battery while keeping the size of the battery small.

Cable-type battery 1 can be fabricated according to the following fabrication method:
  providing at least a first strand 2 of a first polarity type, and at least a second strand 3 of a second polarity type, the second polarity type being the opposite of the first polarity type,
  coating first strand 2 and second strand 3 in an ionically conducting and electrically insulating electrolyte layer 4, first strand 2 being ionically connected to second strand 3, via electrolyte layer 4.

First strand 2 is coated by at least one spacer 5, spacer 5 being electrically insulating, spacer 5 being configured to prevent any direct electric contact between first strand 2 and second strand 3.

The mechanical resistance of the material forming spacer 5 is higher than the mechanical resistance of the material forming electrolyte layer 4.

To form strands 2, 3, electrode material 8, 10 can be deposited on current collector 7, 9 by conventional thin film deposition techniques. These techniques can for example be vacuum deposition techniques such as physical vapor deposition (PVD), chemical vapor deposition (CVD), low pressure chemical vapor deposition (LPCVD), plasma enhanced chemical vapor deposition (PECVD), or thermal evaporation. They can also be wet process deposition techniques such as dip-coating, coating, spraying techniques, electrospraying, electrodeposition, electrodeposition under hydrothermal conditions, or electrophoresis.

Spacer 5 is then deposited at least on the strands of the same polarity. Preferentially, the strands of the same polarity are covered by a plurality of spacers 5 so as to form a layer of spacers 5 on said strands, spacers 5 advantageously being in the form of islands or of particles.

In the case of a layer of particles on the surface of first strand 2, spacer layer 5 is formed by deposition of a solution comprising particles on first strand 2.

In particular, spacer layer 5 is made from a liquid solution comprising the particles to be deposited in suspension in a solvent.

After deposition, or advantageously during deposition, the solvent is evaporated and only the particles remain at the surface of the electrode material.

Deposition can then be performed by conventional wet process deposition techniques such as electrophoresis, deposition by dip-coating-withdrawal, coating, etc.

In the case of a layer of islands of material, deposition of spacer layer 5 comprises the following successive steps:

depositing a thin film on first strand 2,
performing heat treatment so as to melt the material forming the thin film,
cooling the molten material, cooling enabling islands of material to be made to coalesce and solidify.

The thin film is for example formed by chemical vapor deposition (CVD).

The deposition is advantageously followed by melting heat treatment on said layer.

On returning to ambient temperature, droplets thus form which coalesce and solidify, thus forming islands of materials.

What is meant by ambient temperature is a temperature of about 20-25° C.

A discontinuous layer is then obtained—in this embodiment, this layer is formed by a thin film provided with pass-through openings 6.

Strands 2, 3 of each polarity, with and without spacer layer 5, are then assembled to form cable-type battery 1.

This can involve a strand-strand assembly, i.e. an assembly comprising only one strand of each polarity, or a multistrand assembly where the number of strands of each polarity is optimized. The assembly comprises a group of first strands 2 of the first polarity type and a group of second strands 3 of the second polarity type.

Preferentially, first strands 2 and second strands 3 are assembled in the form of a braid or a twist of wires. The presence of spacer layer 5 enables a large tension and/or flexion to be applied when performing assembly of the strands to one another and the separation distances between the strands to be mastered to prevent short-circuits.

The set of strands is then coated in an electrolyte layer.

The electrolyte, which is initially a more or less viscous liquid, can be deposited by dip-coating or spraying techniques, for example.

Depending on the components used, polymerization, or solidification, can be either self-induced, by contact with the humidity of the air for example, or initiated, by a heat treatment or by ultra-violet exposure in particular.

Additives can be added in order to speed up or to initiate the polymerization process. In the case of polymerisation under UV, a photo-initiator can be used. The sheath of electrolyte can then be covered by other elements. A protection layer, or any other suitable element chosen by the person skilled in the art, can be added.

Advantageously, it is possible to treat the materials deposited on the electrolyte layer thermally.

Cable-type battery 1 will now be described by means of the following example, given for illustrative and non-restrictive example purposes only. The battery comprises several strands 2 of the first polarity type and several strands 3 of the second polarity type.

Current collectors 7 have a diameter of 50 µm. They can for example be made from titanium or stainless steel.

Electrode material 8 of strands 2 of the first polarity type is in the form of a LiCoO$_2$ layer with a thickness of 15 µm deposited on the current collectors. This electrode material 8 presents a theoretical capacity of 69 µAh/cm$^2$/µm.

500 nm nanoparticles are arranged around these strands in order to form spacer layer 5.

Strands 3 of the second polarity type, i.e. the strands of opposite polarity, are metallic lithium wires with a diameter of 80 µm.

In a first architecture example, a strand of a first polarity and a strand of a second polarity are associated. This type of cable-type battery presents a very small diameter, about 160 µm, and can present up to 20 µAh/cm linear of battery. In a second example, the diameter of the cable-type battery is 1 mm. In this configuration, about 60 pairs of anode/cathode strands can be associated, which represents a capacity of about 1.2 mAh/cm linear of battery.

The architecture enables the strands to be clamped tightly to one another without any risk of short-circuiting. The spacer layer provides the electric insulation between the strands even under strong mechanical stresses necessary for fabricating the cable-type battery (braiding, twisting, etc.).

The density of strands and balancing of the electrode materials can be easily optimized to achieve very high linear capacities.

Furthermore, the electrolyte thickness is advantageously kept constant in the whole of the battery which enhances a homogeneous electrochemical operation of the electrode materials.

Cable-type batteries are very compact and can present relatively small wire diameters, about 100 µm. Cable-type batteries are moreover very flexible, which makes it possible to envisage integration of these batteries in smart fabrics— the cable-type batteries can be woven or knitted to produce functionalized textiles.

The invention claimed is:

1. A cable-type battery comprising:
at least a first strand of a first polarity type comprising a first current collector,
at least a second strand of a second polarity type comprising a second current collector, the second polarity type being the opposite of the first polarity type,
an electrolyte layer in which the first strand and the second strand are arranged, the electrolyte layer being ionically conducting and electrically insulating so that the first strand is ionically connected to the second strand,
wherein the first strand is coated by at least one spacer, the spacer being electrically insulating, the spacer being configured to prevent any direct contact between the first strand and the second strand,
and wherein the spacer is formed by a first material having a mechanical resistance greater than a mechanical resistance of a second material forming the electrolyte layer.

2. The battery according to claim 1, wherein the first strand is in direct contact with the electrolyte layer and with the spacer.

3. The battery according to claim 1, wherein the first strand and the second strand are both coated by at least one spacer.

4. The battery according to claim 1, wherein the spacer is ionically conducting.

5. The battery according to claim 1, wherein the spacer is made from ceramic.

6. The battery according to claim 5, wherein the first material forming the spacer is chosen from Li$_x$Al$_y$Ge$_z$(PO$_4$)$_3$, Li$_x$Al$_y$Ti$_z$(PO$_4$)$_3$, Li$_x$La$_y$TiO$_z$, Li$_3$PO$_4$, lithium and phosphorus oxynitride, and Al$_2$O$_3$.

7. The battery according to claim 1, wherein the first material forming the spacer is a polymer.

8. The battery according to claim 7, wherein the first material forming the spacer is chosen from polystyrene (PS), polyethylene terephtalate (PET), polyvinyl chloride (PVC), polytetrafluoroethylene (PTFE), polycarbonates (PC), or polymethyl methacrylate (PMMA).

9. The battery according to claim 1, wherein the spacer has a thickness comprised between 10 nm and 10 µm.

10. The battery according to claim 1 wherein the spacer is a thin film provided with at least one pass-through opening to enable contact of the electrolyte layer with the first strand.

11. The battery according to claim 1, wherein the first strand is covered by a plurality of spacers so as to form a spacer layer, the plurality of spacers being in the form of islands or of particles.

12. The battery according to claim 11, wherein the spacer layer is a discontinuous layer of particles, the particles being spaced apart from one another so as to form openings to enable contact of the electrolyte layer with the first strand.

13. The battery according to claim 11, wherein the spacer layer is formed by a plurality of islands spaced apart from one another to enable contact of the electrolyte layer with the first strand.

14. The battery according to claim 1, wherein the first strand and/or the second strand comprise a metal wire forming the first current collector and/or the second current collector covered by an electrode material.

15. The battery according to claim 14, wherein the metal wire is made from Cu, Ni, Ti, Al, Au, Ag, Ta, Ba, Cr, W or a mixture of at least two of these metals or from stainless steel or from super-alloy.

16. The battery according to claim 14, wherein the electrode material is a material that is electrochemically active with respect to ions exchanged between the first strand and the second strand.

17. The battery according to claim 14, wherein the electrode material has a thickness comprised between 100 nm and 100 μm.

18. The battery according to claim 1, wherein the first strand and/or the second strand comprise an insulating core covered by a metallic sheath forming the first current collector.

19. The battery according to claim 18, wherein the metallic sheath is covered by an electrode material.

20. The battery according to claim 1, wherein the first strand and/or the second strand is formed by a metal wire.

21. The battery according to claim 1, wherein at least the first strand or the second strand is made from lithium or from sodium.

22. The battery according to claim 1, wherein the electrolyte layer is formed by a polymer matrix or by an inorganic matrix, said matrix comprising pores filled by a solution comprising at least one lithium or sodium salt.

23. The battery according to claim 1, wherein the battery comprises several strands of the first polarity type and/or several strands of the second polarity type.

24. A method for fabricating a cable-type battery comprising the following successive steps:
providing at least a first strand of a first polarity type, and at least a second strand of a second polarity type, the second polarity type being the opposite of the first polarity type,
arranging the first strand and the second strand in a sheath or electrolyte layer, the electrolyte layer being ionically conducting and electrically insulating, the first strand being ionically connected to the second strand,
a method wherein the first strand is coated by at least one spacer, the spacer being electrically insulating, the spacer being configured to prevent any direct contact between the first strand and the second strand,
and wherein the spacer is formed by a first material having a mechanical resistance greater than a mechanical resistance of a second material forming the electrolyte layer.

25. The method according to claim 24, wherein the first strand and the second strand are assembled in the form of a braid or of a twist.

26. The method according to claim 24, wherein the first strand is covered by a plurality of spacers so as to form a spacer layer, the plurality of spacers being in the form of islands or of particles.

27. The method according to claim 26, wherein the spacer layer is fabricated by deposition of a solution comprising particles on the first strand.

28. The method according to claim 26, wherein deposition of the spacer layer comprises the following successive steps:
depositing a thin film on the first strand,
performing heat treatment so as to melt a material forming the thin film,
cooling said molten material, cooling enabling islands of said material to be made to coalesce and solidify.

* * * * *